US008416747B2

(12) United States Patent
Bai

(10) Patent No.: US 8,416,747 B2
(45) Date of Patent: Apr. 9, 2013

(54) METHOD AND DEVICE FOR PATH SWITCHOVER

(75) Inventor: Lianwei Bai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 292 days.

(21) Appl. No.: 12/879,364

(22) Filed: Sep. 10, 2010

(65) Prior Publication Data

US 2011/0007652 A1    Jan. 13, 2011

Related U.S. Application Data

(63) Continuation of application No. PCT/CN2009/071394, filed on Apr. 22, 2009.

(30) Foreign Application Priority Data

May 9, 2008  (CN) .......................... 2008 1 0096168

(51) Int. Cl.
*H04W 4/00* (2009.01)
*H04W 72/00* (2006.01)

(52) U.S. Cl.
USPC ....................................... 370/332; 455/452.2

(58) Field of Classification Search .................. 370/225, 370/228–232, 252, 329, 331, 332; 455/436–438, 455/450–452.2
See application file for complete search history.

(56) References Cited

U.S. PATENT DOCUMENTS 4,451,916 A * 5/1984 Casper et al. ................. 370/226
6,978,394 B1   12/2005 Charny et al.

2002/0102977 A1 * 8/2002 Shi ................................ 455/437
2006/0126496 A1   6/2006 Filsfils et al.
2009/0147690 A1 * 6/2009 King ............................ 370/245

FOREIGN PATENT DOCUMENTS

| CN | 101159669   | 4/2008  |
|----|-------------|---------|
| JP | 2004-282270 | 10/2004 |
| JP | 2004-326596 | 11/2004 |

OTHER PUBLICATIONS

Chinese Office Action mailed Apr. 6, 2012 issued in corresponding Chinese Patent Application No. 200810096168.1
International Search Report, mailed Jul. 23, 2009, in corresponding International Application PCT/CN2009/071394.
Sangsik Yoon et al., "An Efficient Recovery Mechanism for MPLS-based Protection LSP", IEEE, 2001, pp. 75-79.
Zhuoqing Morley Mao et al., "Route-Flap Damping Exacerbates Internet Routing Convergence", 2002, pp. 221-233.

(Continued)

*Primary Examiner* — Kerri Rose
(74) *Attorney, Agent, or Firm* — Staas & Halsey LLP

(57) ABSTRACT

A method and device for path switchover in communications field are provided. The method includes: detecting communication quality of traffic transmitted on an active path and obtaining a detection value of the communication quality; determining whether the detection value meets a switching condition; if yes, switching the traffic transmitted on the active path to a standby path. The device includes a detecting module, an obtaining module, a determining module and a switching module. The embodiment of the present disclosure integrates the NQA technology for detecting the path communication quality and the TE FRR fast path switching technology, and the NQA detection result may trigger the TE FRR path to switch quickly. Therefore, when the signal quality of the path degrades, making the QoS requirement of the SLA hard to meet, the traffic may be switched to standby path to meet the requirement of the SLA agreed originally between the carrier and the user, so as to improve the user experience and the satisfactory degree on the service provided by the carriers.

4 Claims, 4 Drawing Sheets

OTHER PUBLICATIONS

Ed. V. Sharma et al., "Framework for Multi-Protocol Label Switching (MPLS)-based Recovery", The Internet Society, 2003, pp. 1-40.

Ed. J.P. Lang et al., "RSVP-TE Extensions in Support of End-to-End Generalized Multi-Protocol Label Switching (GMPLS) Recovery", The IETF Trust, 2007, pp. 1-47.

Written Opinion of the International Searching Authority mailed Jul. 23, 2009 issued in corresponding International Patent Application No. PCT/CN2009/071394.

European Search Report dated Sep. 27, 2011 issued in corresponding European Patent Application No. 09741686.1.

\* cited by examiner

METHOD AND DEVICE FOR PATH SWITCHOVER

CROSS-REFERENCE TO RELATED APPLICATIONS

This application is a continuation of International Application No. PCT/CN2009/071394, filed on Apr. 22, 2009, which claims priority to Chinese Patent Application No. 200810096168.1, filed on May 9, 2008, both of which are hereby incorporated by reference in their entireties.

FIELD OF THE INVENTION

This application relates to the communications field, in particular, to a method and device for path switchover.

BACKGROUND OF THE INVENTION

At present, the great development of communications technology accelerates the upgrading of the communications network; the security of the network, however, is the most fundamental performance criteria. For example, for the voice service, the switching time for end-to-end protection must be within 200 ms to meet the performance criteria. In order to meet various performance criteria, the IP bearer network brings into the device, path, network, etc Multi-Protocol Label Switching, Traffic Engineering (MPLS TE) protection technology.

The MPLS TE technology refers to the combination of MPLS and Resource Reservation Protocol (RSVP) TE technologies, which performs the end-to-end resource reservation by establishing specified a Label Switch Path (LSP); when a congestion occurs in an IP backbone networks (a local traffic congestion may be for network resource insufficiency or imbalance), the traffic may bypass the congestion node to realize the balance of the network traffic. When resources are limited, the MPLS TE may preempt the LSP bandwidth of low priority to meet the requirement of high bandwidth LSP or important service.

Meanwhile, when a congestion occurs in a path on the LSP or at a node of the network, the MPLS TE may quickly switch the traffic to the standby path through the Fast Reroute (FRR), where FRR in the MPLS TE (TE FRR) is a technology for realizing local network congestion protection of the network; the TE FRR ensures that the traffic may be quickly switched to the standby path when passing the congestion of the path or node; the speed of the TE FRR switching may be less than 50 ms, which can reduce the traffic data loss caused by the network congestion to a great extent.

On the basis of the RSVP-TE signaling protocol, the fault of the path and the node device is detected and the TE FRR is triggered, and hello packets may be transmitted periodically between RSVP-TE devices to detect the activity of the adjacent devices; if a fault occurs to the paths and the node devices that need protection, the hello packets may not be transmitted normally between adjacent RSVP-TE devices, and then the adjacent devices where the fault occurs may not receive the hello packets; after multiple periods of hello packet (normally 3, the shortest of which is 1 s), it is determined that the fault occurs, and the TE FRR is triggered to switch, and then the traffic is switched to the pre-set standby path. The conventional art, however, takes at least 3 s to detect the fault of the adjacent devices and then trigger the TE FRR switching; as a result, this can not meet the requirement of the real-time services, such as speech, video, etc on the interruption interval; when the path and node devices work normally, and a fault occurs on a forwarding engines, ie on routers, where the fault is caused by a fault on the forwarding engines or internal errors, this fault can not be detected.

In the present disclosure, a method for detecting the path and node faults through a Bidirection Forwarding Detection (BFD) protocol and triggering the TE EFRR is provided. At present, the BFD is applied to types of protocol, including many routing protocols, MPLS TE, etc. The BFD protocol is deployed among the adjacent devices to detect the faults in the paths between the adjacent devices, the node devices, or even the faults on forwarding engines themselves. When the BFD is applied to TE FRR, the BFD protocol is run among the RSVP-TE adjacent devices, and packets are sent periodically. The packets are generated by the forwarding engine, and as a result, under the condition that two devices are connected by a transmission equipment, the BFD may bidirectionally detect the faults in the path at one end, the node device or even the transmission equipment in as short as 30 ms, and then trigger the TE FRR to switch to the standby path, so that the deficiencies of detecting the faults in the path and the node device and triggering the TE FRR by the RSVP-TE signaling protocol may be overcome.

Along with the development of the value-added service of the carriers, the requirement posed by the users and the carriers on the Quality of Service (QoS) is increasingly higher; particularly, after real-time voice and video services transmitted on the conventional IP network, it is common that the carrier and the user sign a Service Level Agreement (SLA). Since the carrier network, especially the massive carrier network, usually undergoes the long-distance transmission path; therefore, the signal attenuation of some extent caused by the path and the transmission equipment themselves is unavoidable. Since many long-distance transmission paths adopt the original transmission paths or paths via the satellite and microwave, the signal quality and the QoS can not be guaranteed, either could the SLA signed by the user be satisfied, thereby degrading the user's experience and the satisfactory degree of the user to the carrier.

In the above solution, although it is guaranteed that the TE FRR is triggered after the fault is detected; when the quality of the signal degrades, for example, when the congestion caused by heavy traffic (especially, burst traffic for wide application of Peer to Peer (P2P), attack on network, equipment virus, etc) occurs in the path of the traffic of the voice and video real-time services, a great deal of packet loss may happen to the traffic of the voice and video real-time service or long delay may occur, thereby seriously degrading the QoS. Under this condition, however, faults do not occur in the path and node that carry the traffic, and in the solution of the prior art, the TE FRR can not triggered; as a result, even though a light-load standby path is deployed in the conventional network, the TE FRR can not be triggered to switch to the standby path, thereby degrading the QoS and causing the waste of the path and bandwidth.

SUMMARY OF THE INVENTION

In order to meet the SLA signed by the carriers and users, guarantee the QoS of the transmission, and avoid the waste of the path and bandwidth, the present disclosure provides a method and device for path switchover as follows.

The method for path switchover includes the following:
detecting the communication quality of traffic transmitted on the active path and obtaining a detection value of the communication quality;
determining whether the detection value meets a switching condition; and switching the traffic transmitted on the active path to the standby path, if the switching condition is met.

A path switching device includes the following:

a detecting module, configured to detect the communication quality of traffic transmitted on the active path;

a obtaining module, configured to obtain a detection value of the communication quality according to the detection of the detecting module;

a determining module, configured to determine whether the detection value meets the switching condition according to the detection value obtained by the obtaining module; and a switching module, configured to switch the traffic transmitted on the active path to the standby path, if the switching condition is met.

In the present disclosure, the method for switching the path may integrate the Network Quality Analysis (NQA) technology, detecting path signal quality, with the fast path switching technology of the TE FRR, and the detection value of the NQA technology may trigger the fast path switching of the TE FRR. When the signal quality of the path degrades, making the QoS requirement of the SLA hard to meet, by using the method provided in the present disclosure to deploy the network of the carrier, the traffic may be switched to standby path to meet the requirement of the SLA as originally agreed between the carrier and the user; as a result, the satisfactory degree of the user to the carrier is improved to effectively reduce the complaints from the user and the compensation claimed by the user.

DETAILED DESCRIPTION OF THE EMBODIMENT

To make purposes, solutions and benefits of the present disclosure clearer, detailed descriptions for the embodiments of the present disclosure are given below with reference to the accompanying drawings.

The present disclosure provides a path switching method, which incorporates the NQA technology with the TE FRR technology to detect communication quality of a TE Tunnel or the QoS of a service transmitted by the TE Tunnel through the NQA technology, and the detected parameters may include a packet loss ratio, forwarding delay, delay jitter; or even a specific application or a protocol, where the protocol may be Transmission Control Protocol (TCP), User Datagram Protocol Hypertext Transfer Protocol (UDP), Dynamic Host Configuration Protocol (DHCP), is detected to check whether the QoS meets the requirement. When the detection value of the detected object degrades to be smaller than a set value, where the set value may be set according to the SLA signed by the carrier and the subscribers, the TE FRR is triggered to the standby path, so as to ensure that the state of TE Tunnel or the quality of the service transmitted on the TE Tunnel may reach the anticipated level. The method is specifically as follows: detecting the quality of service transmitted on an active path and obtaining a detection value on communication quality parameters; determining whether the detection value on the communication quality parameters meets a preset switching condition; if the preset switching condition is met, switching the traffic transmitted on the active path to a standby path.

In the present disclosure, the method for switching the path may integrate the Network Quality Analysis (NQA) technology with the fast path switching technology of the TE FRR, the detection value of the NQA technology may trigger the fast path switching of the TE FRR. When the signal quality of the path degrades making the QoS requirement of the SLA hard to meet, by using the method provided in the present disclosure to deploy the network of the carrier, the traffic may be switched to standby path to meet the requirement of the SLA agreed originally between the carrier and the user; as a result, the satisfactory degree of the user to the carrier is improved to effectively reduce the complaints from the user and the compensation claimed by the user.

Persons skilled in the art all know that in an IP network, the data traffic may be forwarded through multiple technologies, including IP forwarding, MPLD Label Distribution Protocol (LDP) forwarding, and MPLS TE forwarding, whose switching protection mechanisms are IP FRR, LDP FRR and TE FRR respectively.

The triggering mechanisms are the same regardless of the types of forwarding and the associated switching protection mechanisms. The following embodiment takes the example of deploying MPLS TE in an IP network.

EMBODIMENT 1

Figure 1:
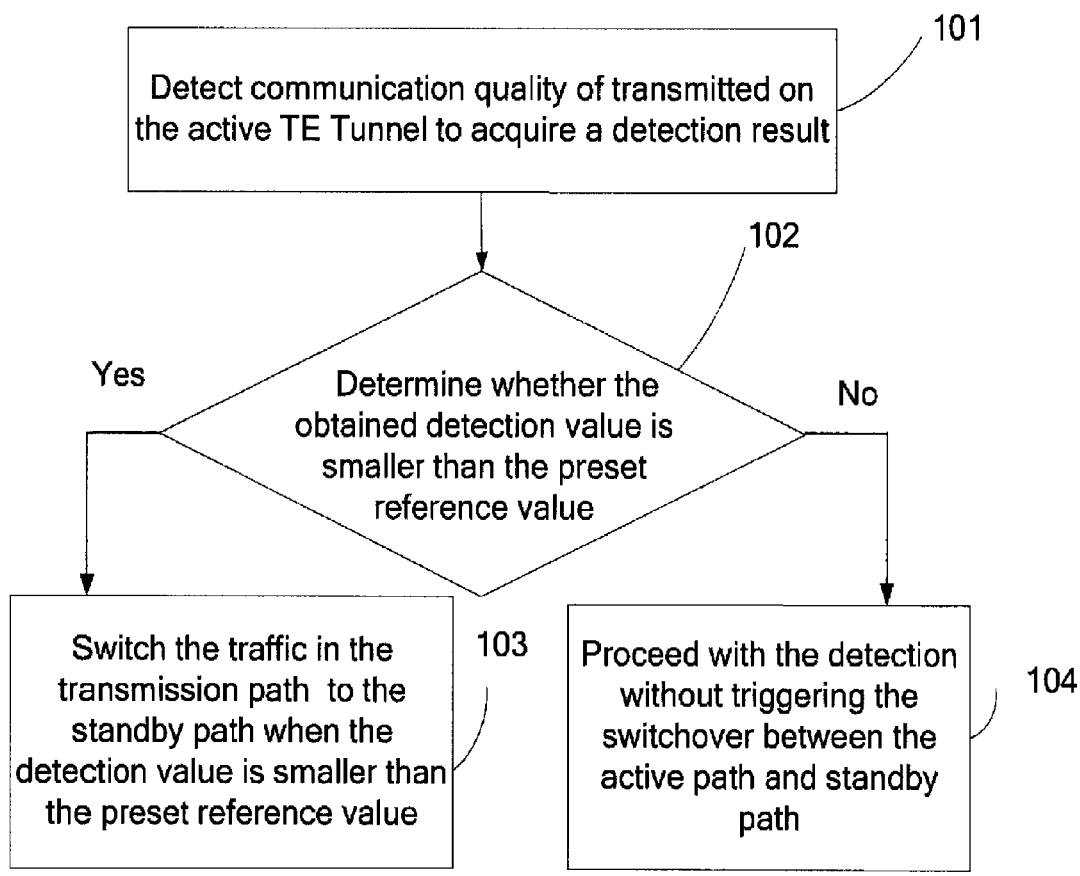
FIG. 1 is a flow chart of a method for switching the path according to embodiment one of the present disclosure.

Referring to FIG. 1, the embodiment of present disclosure provides a method for path switchover; forwarding the traffic through the MPLS TE in the network is taken as an example, which is as follows:

101: Detect quality of a service traffic transmitted on the main TE Tunnel and acquire the detection result.

The detection on the QoS of the transmission path may be realized through NQA, and the NQA may detect the performances of various protocols running on the internet, so the operation indicators of various network services may be connected in real time; for example, the total delay of the HTTP, the TCP connection delay, the Domain Name System/Domain Name Service (DNS) parsing delay, the file transmission rate, the File Transfer Protocol (FTP) connection delay, or the DNS parsing error ratio. The NQA is also an effective tool for detecting and locating the network fault, thereby easily finding out the network problems. Namely, the NQA is an extension and enhancement of the Ping function. Ping tests the round-trip time of the packet from the local terminal to the specified destination terminal through the Internet Control Message Protocol (ICMP). The NQA can not only accomplish this task, but also detect whether the services of TCP, UDP, DHCP, FTP, HTTP, SNMP, etc are open and detect the response time of various services to acquire the communication quality of each service. For example, the NQA detection may be adopted to acquire the voice's QoS of the transmission path, such as parameters of packet loss rate, delay, and jitter.

Multiple detection instances may be deployed on one network transmission device, for example, an NQA process may be launched for the TCP detection, or an NQA process may also be launched for the UDP detection, which may be decided accordingly.

The quality of the transmission path is detected as required, and when the detection value is detected, the transmission path may be detected in real time so as to obtain the detection value in real time, or the transmission path may be detected according a preset time interval to obtain the detection value according to the preset time, where the embodiment of the present disclosure does not limit the specific time interval.

102: Determine whether the obtained detection value is lower than the preset reference value; if yes, proceed with step 103; otherwise, proceed with step 104.

The preset reference value is a switching condition and may be set according to the specific network deployment. When the obtained detection value meets the switching condition, the active/standby path switching may be triggered.

103: When the detection value is lower than the preset reference value, the service traffic in the transmission path is switched to the standby path.

In the network, the standby path may be deployed for the transmission path through TE FRR. When the detection value is lower than the preset reference value, the service traffic in the transmission path is switched to the standby path.

104: When the obtained detection value is not lower than the preset preference value, the active/standby path switching is not triggered, and the detection proceeds.

Figure 2:
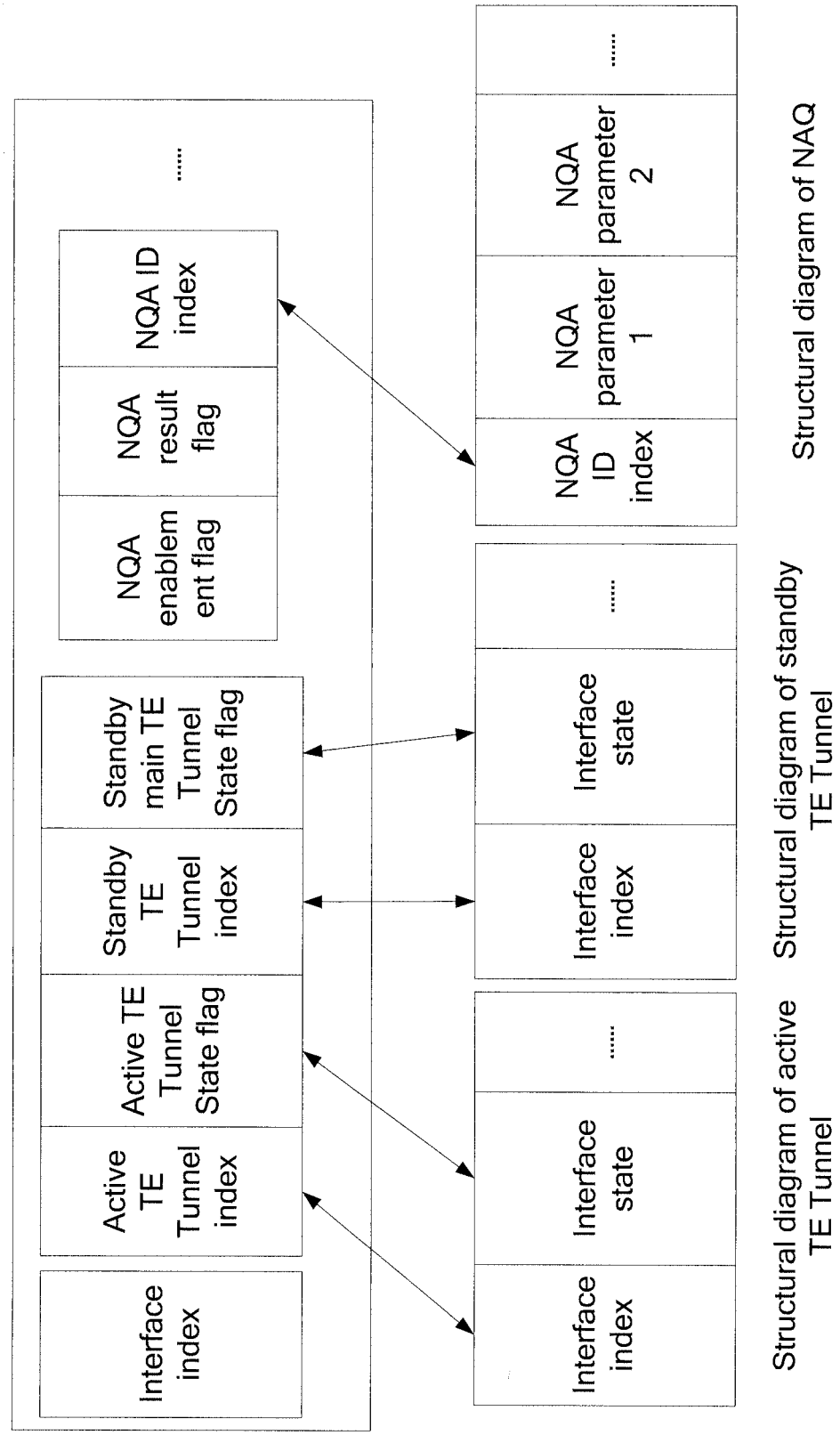
FIG. 2 is a diagram showing the implementation of embodiment one of the present disclosure through an internal communication interface by deploying NQA and TE FRR in the network.

To summarize, in the method provided in the embodiment of the present disclosure, the NQA detection result is a condition for triggering the TE FRR, the NQA detection instances are deployed for the TE Tunnel protected by the TE FRR, or for specific services transmitted on the TE Tunnel protected by the TE FRR. FIG. 2 is a diagram showing the implementation of the embodiment of the present disclosure through the internal communication interface by deploying the NQA and TE FRR in the network. As is shown in FIG. 2, the NQA detection instance may set an internal ID to identify the NQA detection instance and allocate part of the storage space to store the detection result. At the time of establishing a TE Tunnel, a TE Tunnel logic interface may be established and the state information of the TE Tunnel and the standby TE Tunnel is stored; two flag bits and one index value may be added to the TE Tunnel logic interface, where the two flag bits may be an enablement flag bit indicating whether the NQA detection is enabled and a result flag bit indicating whether the NQA detection result is normal; the index value is associated with the internal numbering ID of the NQA detection instance. When the TE Tunnel deploys, through a configuration command, the NQA to monitor the communication quality, the enablement flag bit of the TE Tunnel logical interface is set to enable the NQA detection firstly, and a corresponding NQA detection instance is automatically established; then a reference value of the NQA detection requirement is designated through the configuration command, the default value of the result flag bit of the NQA detection result is set as normal, and the internal serial number designated for the NQA is filled into the index value of the TE Tunnel logical interface. As a result, an internal communication interface is established between the TE Tunnel and the NQA; meanwhile, a reference value about the communication quality is set.

The NQA detection instance detects the communication quality of the TE Tunnel or a service in the TE Tunnel in real time and compares the value with the reference value; when the communication value is lower than the reference value, the TE Tunnel is informed of the this event through the internal communication logical interface of this NQA; then the active TE Tunnel state corresponding to the TE Tunnel logical interface is set at an egress node of the TE Tunnel, and the TE FRR is triggered to switch to the standby TE Tunnel.

In addition, when the data traffic of the active TE Tunnel is switched to the standby TE Tunnel through the TE FRR, the NQA detection is realized by transmitting the detection package to the designated channel; since the NQA detection instances may still detect the TE Tunnel communication quality, the traffic may switch back to the active TE Tunnel when the value of the communication quality reaches the reference value.

To summarize, the embodiment of the present disclosure integrates the NQA technology for detecting the path communication quality and the TE FRR fast path switching technology, and the NQA detection result may trigger the TE FRR path to switch quickly. Therefore, by deploying this technology in the network of the carrier, when the signal quality of the path degrades, making the QoS requirement of the SLA hard to meet, the traffic may be switched to standby path to meet the requirement of the SLA as originally agreed between the carrier and the user, so as to reduce the complaints from the user and the compensation claimed by the user.

EMBODIMENT 2

On the basis of embodiment 1, in order to overcome the problem that the traffic switches from the active TE Tunnel to the standby TE Tunnel frequently due to the unstable path communication quality, a vibration suppression method is provided in an embodiment of the present disclosure to guarantee an optimal communication quality. The embodiment is as follows:

Firstly, the service traffic in the active TE Tunnel is detected to acquire a detection value.

Figure 3:
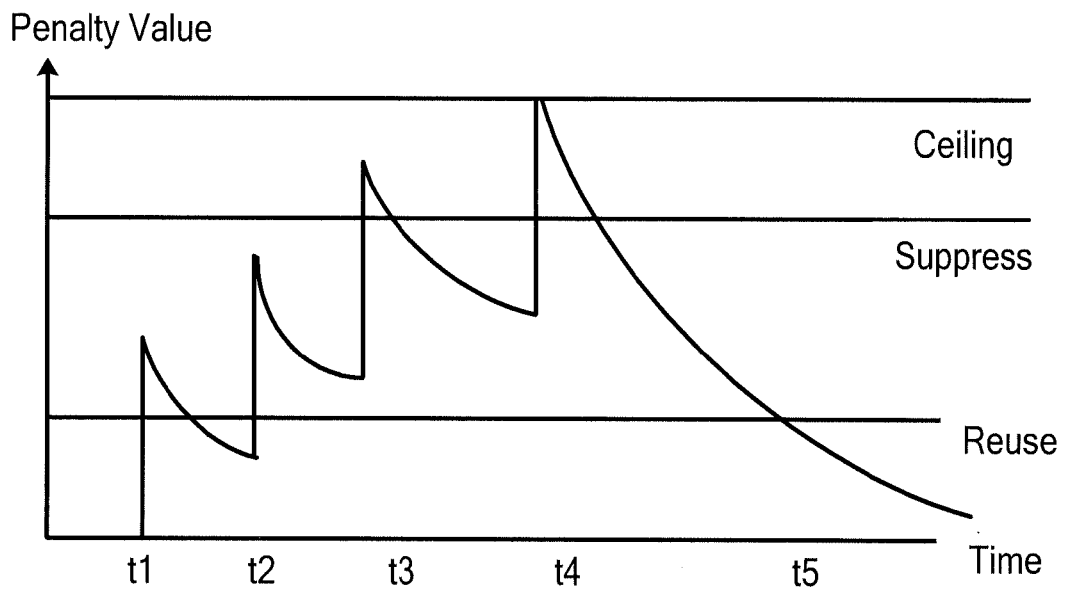
FIG. 3 is a diagram of suppressing path vibration in embodiment two of the present disclosure.

Then four parameters of penalty value, Suppress, reuse and ceiling are set by using the method of vibration suppression. FIG. 3 is a diagram of the path vibration suppression. The TE Tunnel communication quality is set as the ceiling; the communication quality reference value is set as the Suppress, while a reuse of the communication quality is set as well. When the TE Tunnel communication quality is degraded and the Suppress is reached, and then the TE FRR is triggered to switch; then after a period of time, when the communication quality of the active TE Tunnel reaches the Suppress, in order to prevent the vibration, the path switchback is triggered when the communication quality reaches the reuse. Therefore, a fast switching to the standby path may be realized when the path quality degrades, while the frequent switching and switchback due to the unstable path signal quality may be avoided, thereby ensuring an optimal communication quality.

To summarize, the embodiment of the present disclosure integrates the NQA technology for detecting the path communication quality and the TE FRR fast path switching technology, and the NQA detection result may trigger the TE FRR path to switch quickly. Therefore, by deploying this technology in the network of the carrier, when the signal quality of the path degrades, making the QoS requirement of the SLA hard to meet, the traffic may be switched to standby path to meet the requirement of the SLA as originally agreed between the carrier and the user, so as to reduce the complaints from the user and the compensation claimed by the user. Meanwhile, the problem of frequent switching and switchback of the traffic due to the unstable path communication quality is effectively overcome, thereby ensuring an optimal communication quality.

EMBODIMENT 3

Figure 4:
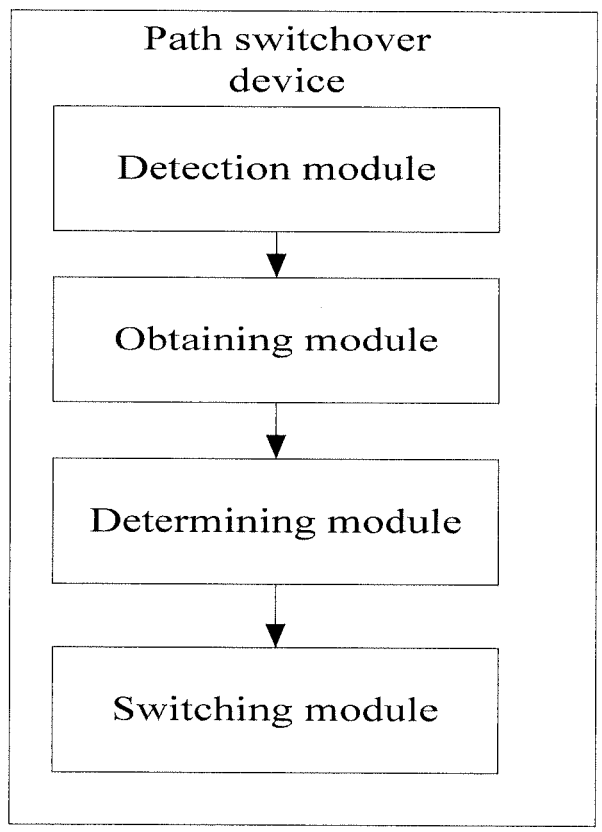
FIG. 4 is a diagram showing a path switching device.

As shown in FIG. 4, the present disclosure provides a device for path switching and the device the following modules:

a detecting module, configured to detect communication quality of traffic, transmitted on the active path;

an obtaining module, configured to obtain the detection result according to the detection of the detecting module;

a determining module, configured to determine whether the detection result meets a switching condition according to the obtained detection result; and a switching module, configured to switch the traffic transmitted on the active path to the standby path when the detection result is positive.

When the obtaining module obtains the detection result of the communication quality from the detecting module, the obtaining module may obtain one communication quality parameter or multiple communication quality parameters; for example, when NQA is adopted for detection, the NQA may detect whether the TCP, UDP, DHCP, FTP, HTTP, and Simple Network Management Protocol (SNMP) are open and detect the response time of the services, in order to acquire the communication quality of various services; therefore, the detection result of the communication quality parameters that are required may be obtained based on the specific requirements set by the system.

The detecting module includes:

a detecting unit, configured to detect the communication quality of the service traffic in the active path through the NQA.

For different deployment environments of a path switching device in the embodiment of the present disclosure, the detecting modules includes a detecting unit, configured to detect the communication quality of the service traffic in the IP switched path, or detect the communication quality of the service traffic in the LDP LSP; or detect communication quality of the service traffic in the TE LSP.

Figure 5:
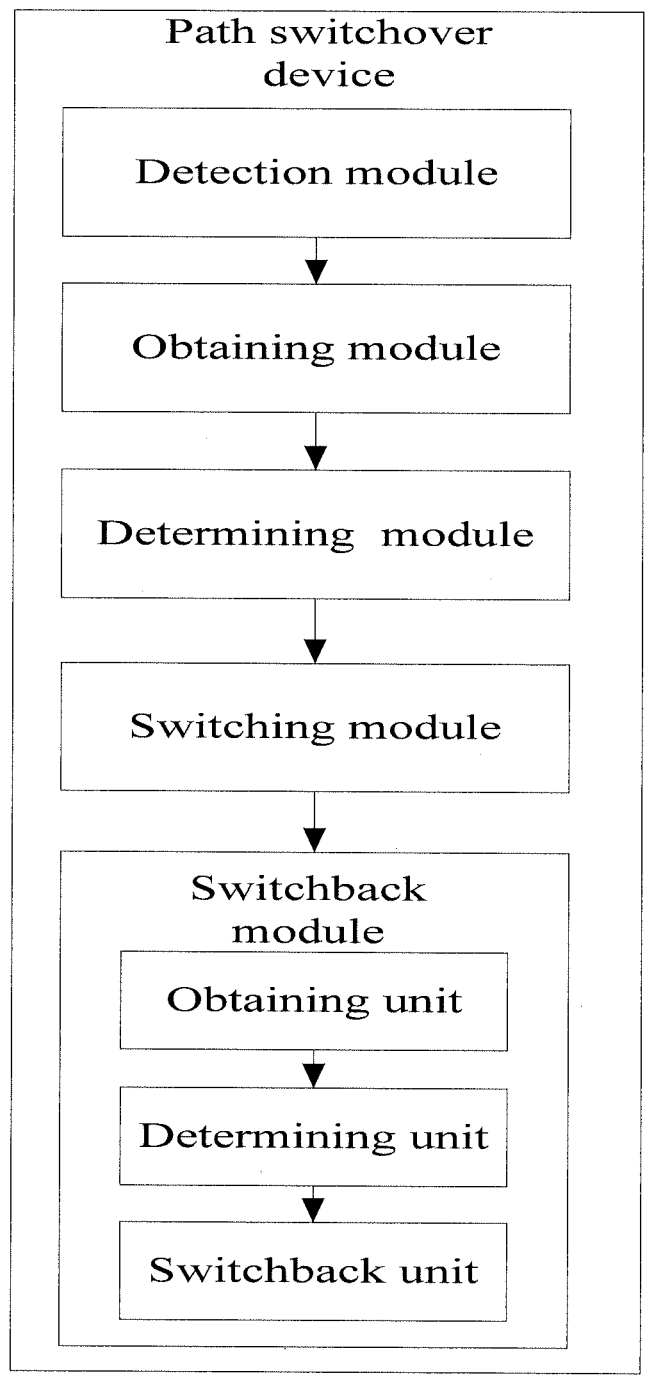
FIG. 5 is another diagram showing a path switching device.

When the switching between the active path and the standby path occurs, in the present disclosure, the path switchback may be implemented from the standby path to the active path. Therefore, as in FIG. 5, the path switching device provided in present disclosure may further include:

a switchback module, configured to determine whether a switchback condition is met after the switching of the service from the active path to the standby path and switch the traffic transmitted on the standby path back to the active path if the switchback condition is met.

The switchback module includes specifically as follows:

an obtaining unit, configured to obtain a detection value of the communication quality of the traffic transmitted on an active path when the switching module switches the service transmitted on the active path to a standby path;

a determining unit, configured to determine whether the detection value reaches a reference value; and a switchback unit, configured to switch the traffic transmitted on the standby path back to the active path when the determining result is positive.

The step of determining whether the detection value reaches the reference value by the determining unit is specifically determining whether the detection value is equivalent to the reference value.

The path switching device provided in the embodiments of the present disclosure may support the switching from the active TE Tunnel back to the standby TE Tunnel when determining that the detection value meets the switching condition, and after the switching from the active path to the standby path, the switchback module may also support the switching of the service data traffic transmitted on the standby path back to the active path when the detection value obtained in real time or periodically reaches the reference value. During the implementation of the path switching device in the embodiments of the present disclosure, inventors find that limited bandwidth or other factors may lead to instability of the communication quality in the path that carries service, jitters may occur on the detection value obtained in real time or periodically, causing fluctuation around the reference value; as a result, frequent switching and switchback of the service traffic may occur between the active TE Tunnel and standby TE Tunnel. Therefore, by employing the path switching device in the present disclosure, after the switching from the active TE Tunnel to standby TE Tunnel, two reference values are set, and then switchback is implemented under the condition that two detection values obtained in turn reach the switching reference values respectively, so that frequent switching and switchback due to instability of the path signal quality may be avoided to ensure an optimal communication quality.

The above switchback module includes specifically as follows:

an obtaining unit, configured to obtain a first detection value and a second detection value;

a determining unit, configured to determine whether the first detection value reaches a first preset reference value and determine whether the second detection value reaches a second preset reference value; and a switchback unit, configured to switch the traffic transmitted on the standby path back to the active path when the determining result is positive.

FIG. 3 is an exemplary diagram for illustrating a path switching device capable of executing switching between the standby path and the active path and capable of suppressing the path vibration during the switching. The path communication quality of the active TE Tunnel is defined as Penalty Value; the reference value of the communication quality is defined as Suppress; meanwhile, Reuse of the communication quality is also defined. When the communication quality of the main TE Tunnel degrades to the Suppress, the TE FRR switching is triggered; when the communication quality of the main TE Tunnel reaches again the Suppress (corresponding to the first detection value), to prevent a vibration, the path switchback is triggered after a period of time when the communication quality reaches the Reuse (corresponding to the second detection value); therefore, it is ensured that when the communication quality degrades, the path is switched to the standby path in time, and meanwhile, frequent switching and switchback due to instability of the path communication quality may be avoided to ensure an optimal communication quality.

The path switching device provided in the present disclosure may trigger the TE FRR in response to a communication quality degradation in the active path; when the device is deployed in the network of the carriers, the signal quality of the path degrades, making the QoS requirement of the SLA hard to meet, the traffic may be switched to standby path to meet the requirement of the SLA agreed originally between the carrier and the user; as a result, the satisfactory degree of the user to the carrier is improved to effectively reduce the complaints from the user and the compensation claimed by the user.

To summarize, the embodiment of the present disclosure integrates the NQA technology for detecting the path communication quality and the TE FRR fast path switching technology, and the NQA detection result may trigger the TE FRR path to switch quickly. Therefore, by deploying this technology in the network of the carrier, when the signal quality of the path degrades, making the QoS requirement of the SLA hard to meet, the traffic may be switched to the standby path to meet the requirement of the SLA as originally agreed between the carrier and the user, so as to reduce the complaints from the user and the compensation claimed by the user. Meanwhile, the problem of frequent switching and switchback of the traffic due to the unstable path communication quality is effectively overcome, thereby ensuring an optimal communication quality.

Persons skilled in the art may also acquire that for IP forwarding, the fast path switching technology is IP FRR, and the NQA technology and TP FRR may be integrated to trigger the TP FRR to switch to the standby path based on the NQA detection result; or NQA technology and the LDP FRR may also be integrated to trigger the LDP FRR to switch to the standby path based on the NQA detection result. For other path switching technology, the integration with the NQA detection result may also be considered to realize a smooth path switching when the communication quality in a path degrades.

Part of the steps according to the above embodiments in the present disclosure may be implemented by software. The software program may be stored in a computer readable storage media, as a CD (compact disk), a hard disk, etc.

Detailed descriptions have been made above to specific implementations of the invention. To those skilled in the art, various changes and improvements may be made without departing from the principle of the invention, and these changes and improvements are intended to fall within the scope of the invention.

The invention claimed is:

1. A method for path switchover, comprising:
  detecting communication quality of traffic transmitted on an active path and obtaining a detection value of the communication quality;
  determining whether the detection value meets a switching condition;
  switching the traffic transmitted on the active path to a standby path, if the switching condition is met;
  determining whether a switchback condition is met after the traffic is switched from the active path to the standby path; and
  switching the traffic transmitted on the standby path back to the active path if the switchback condition is met;
  wherein the determining whether a switchback condition is met comprises:
    obtaining a first detection value and a second detection value in turn; and
    determining whether the first detection value reaches a first preset reference value and determining whether the second detection value reaches a second preset reference value; wherein the switchback condition is met when the first detection value reaches a first preset reference value and the second detection value reaches a second preset reference value; the switchback condition is not met when the first detection value does not reach a first preset reference value or the second detection value does not reach a second preset reference value.

2. The method of claim 1, wherein the detecting the communication quality of traffic transmitted on the active path comprises:
  detecting the communication quality of traffic transmitted on the active path through Network Quality Analysis (NQA) technology.

3. The method of claim 1, wherein the determining whether the detection value meets a switching condition comprises:
  determining whether the detection value is smaller than a preset reference value; if the detection value is smaller, the switching condition is met; if the detection value is not smaller, the switching condition is not met.

4. The method of claim 1, wherein
  the active path is an IP forwarding path;
  the active path is an Label Switch Path of the Label Distribution Protocol (LDP LSP); or
  the active path is an Label Switch Path of the Traffic Engineering (TE LSP).

* * * * *